(12) United States Patent
Florentinus de Maaijer (10) Patent No.: US 9,112,588 B2
(45) Date of Patent: Aug. 18, 2015

(54) WI-FI TRANSCEIVER HAVING DUAL-BAND VIRTUAL CONCURRENT CONNECTION MODE AND METHOD OF OPERATION THEREOF

(71) Applicant: ICERA, Inc., Wilmington, DE (US)

(72) Inventor: Lucas Maria Florentinus de Maaijer, Belfeld (NL)

(73) Assignee: NVIDIA CORPORATION, Santa Clara, CA (US)

( * ) Notice: Subject to any disclaimer, the term of this patent is extended or adjusted under 35 U.S.C. 154(b) by 12 days.

(21) Appl. No.: 14/134,268

(22) Filed: Dec. 19, 2013

(65) Prior Publication Data

US 2015/0180530 A1 Jun. 25, 2015

(51) Int. Cl.
*H04B 1/38* (2015.01)
*H04B 1/401* (2015.01)
*H04B 7/04* (2006.01)
*H04W 88/06* (2009.01)

(52) U.S. Cl.
CPC .............. *H04B 1/401* (2013.01); *H04B 7/0413* (2013.01); *H04W 88/06* (2013.01)

(58) Field of Classification Search
CPC ....... H04M 11/04; H04N 7/20; H04N 5/4401; H04N 5/40; H04W 84/06

USPC ................................. 375/219; 370/276; 455/1
See application file for complete search history.

(56) References Cited

U.S. PATENT DOCUMENTS

| | | | | |
|---|---|---|---|---|
| 6,728,517 | B2 * | 4/2004 | Sugar et al. ..................... | 455/73 |
| 2002/0193090 | A1 * | 12/2002 | Sugar et al. ................... | 455/343 |
| 2006/0223483 | A1 * | 10/2006 | Behzad ......................... | 455/323 |
| 2012/0092053 | A1 * | 4/2012 | Narathong et al. ........... | 327/159 |

\* cited by examiner

*Primary Examiner* — Shuwang Liu
*Assistant Examiner* — Helene Tayong (57) ABSTRACT

A transceiver, a method of providing multiple-band virtual concurrent wireless communication and a wireless device incorporating the transceiver or the method. In one embodiment, the transceiver includes: (1) first transmit and receive intermediate frequency (IF) strips, (2) second transmit and receive IF strips, (3) first and second local oscillators (LOs) and (4) switches operable to multiplex clock signals from the first and second local oscillators to cause the transceiver to operate in a selectable one of: (4a) a unified, multiple-input, multiple-output (MIMO) mode in which the first and second transmit and receive IF strips are driven to transmit and receive in a first band and (4b) a concurrent multiple-band connection mode in which the first transmit and receive IF strips are driven in the first band and the second transmit and receive IF strips are concurrently driven in a second band.

17 Claims, 6 Drawing Sheets

FIG. 1

| FIG. 2A | FIG. 2B |
| --- | --- |
| FIG. 2C | FIG. 2D |

WI-FI TRANSCEIVER HAVING DUAL-BAND VIRTUAL CONCURRENT CONNECTION MODE AND METHOD OF OPERATION THEREOF

TECHNICAL FIELD

This application is directed, in general, to Wi-Fi devices and, more specifically, to a Wi-Fi transceiver for a wireless device that has a dual-band virtual concurrent connection mode and a method of operating the same.

BACKGROUND

Mobile devices such as cellphones, smartphones, tablets and laptops are ubiquitous. While they were originally introduced to provide rudimentary functionality, such as telephony and text messaging, they have now evolved to the point that they have begun to replicate the functions of physically much larger computers, such as desktop personal computers. Accordingly, mobile devices are beginning to be used for gaming, desktop publishing and graphics and video editing. These are particularly computation- and graphics-intensive applications, and test the general- and special-purpose processing and storage limits of mobile devices.

Supporting the ever-intensifying use of mobile devices is an evermore-capable wireless network infrastructure, making its presence known in both cellular and wireless Internet access (Wi-Fi) forms. Consequently, mobile devices are able to make higher-bandwidth, more reliable wireless connections in more places than ever before possible.

As a result of all of the above, more-capable mobile devices (smartphones, gaming consoles and tablets in particular) have begun to spawn short-range wireless networks of their own, allowing other devices to be "tethered" to the more-capable mobile devices, which then serve as proxies for access to the wireless network infrastructure. Bluetooth and Wi-Fi Direct are two notable technologies that make possible such short-range peer-to-peer wireless networks, sometimes called personal area networks (PANs) or piconets. Not only can two smartphones, pads and tablets be tethered to one another via Bluetooth or Wi-Fi Direct, but a host of less-capable devices can be tethered as well, such as cell phones, earphones, headsets, speakers, displays, gaming controllers and remotes, sensors and actuators, to name just a few.

SUMMARY

One aspect provides a transceiver. In one embodiment, the transceiver includes: (1) first transmit and receive intermediate frequency (IF) strips, (2) second transmit and receive IF strips, (3) first and second local oscillators (LOs) and (4) switches operable to multiplex clock signals from the first and second local oscillators to cause the transceiver to operate in a selectable one of: (4a) a unified, multiple-input, multiple-output (MIMO) mode in which the first and second transmit and receive IF strips are driven to transmit and receive in a first band and (4b) a concurrent multiple-band connection mode in which the first transmit and receive IF strips are driven in the first band and the second transmit and receive IF strips are concurrently driven in a second band.

Another aspect provides a method of providing multiple-band virtual concurrent wireless communication. In one embodiment, the method includes: (1) causing a transceiver to operate in a unified, multiple-input, multiple-output mode in which an LO drives first and second transmit and receive IF strips therein to transmit and receive using first and second antennas in a first band and (2) causing the transceiver to operate in a concurrent multiple-band connection mode in which the LO drives the first transmit and receive IF strips to transmit and receive using the first antenna in the first band and another LO drives the second transmit and receive IF strips to transmit and receive concurrently in a second band.

Yet another aspect provides a wireless device. In one embodiment, the wireless device includes: (1) a radio-frequency (RF) front-end, having: (1a) first and second antennas, (1b) first transmit and receive IF strips coupled to the first antenna, (1c) second transmit and receive IF strips coupled to the second antenna, (1d) a first local oscillator (LO) operable to cause modulation in one of a first band and a second band and (1e) a second LO operable to cause modulation in a second band, (2) a digital baseband coupled to the RF front-end and operable in a unified, MIMO mode and a multiple-band connection mode and having: (2a) first and second time domain channel circuitry for first and second time-domain channels, (2b) MIMO processing circuitry coupled to the first and second time domain channel circuitry, (2c) first and second bit processing circuitry coupled to the MIMO processing circuitry and (2d) first and second media-access controllers (MACs) coupled to the first and second bit processing circuitry, the first MAC operable as MIMO processing circuitry in the multiple-band connection mode and (3) other wireless device circuitry coupled to the digital baseband.

BRIEF DESCRIPTION

Reference is now made to the following descriptions taken in conjunction with the accompanying drawings, in which.

DETAILED DESCRIPTION

As stated above, modern mobile devices are able not only to communicate with other networks, such as the Internet, but are also capable of communicating with short-range wireless networks. Institute of Electrical and Electronics Engineers (IEEE) standard 802-11 provides one framework for wirelessly networking devices. In an effort further to standardize wireless networking, the Wi-Fi Alliance has further defined not only a client-server wireless connection by which a wireless access point (WAP) provides access to a network for a wireless device (called a "station" in this context), but also a peer-to-peer wireless connection (called "Wi-Fi Direct" or "Wi-Fi P2P") by which one wireless device can act as a group owner for another. The client-server connection allows the wireless device to connect to a network such as the Internet, while the peer-to-peer wireless connection allows the wireless device to have other devices tethered to it, such as a television for providing an enhanced video display.

As those skilled in the pertinent art are familiar, two RF bands have been made available to support wireless networking. One is the 2.4 GHz band, and the other is the 5 GHz band.

Other bands may be defined and made available in the future. This disclosure will sometimes refer to "dual connections" or "dual-band." However, those skilled in the pertinent art will understand that the embodiments described herein apply to more than two concurrent connections and more than two bands, as such may be made available in the future.

Irrespective of whether the connections are client-server or peer-to-peer, and irrespective of the band(s) involved, it has become not only possible but advantageous for a wireless device to use multiple connections concurrently. For example, the device may be able to download content from the Internet via multiple WAPs. Alternatively, the device may be coupled to the Internet for cloud gaming and, at the same time, communicate the resulting video output to a television for display.

Concurrent virtual connections are achieved through time-sharing, namely toggling quickly between or among the multiple connections. In other words, communication takes place over one connection (also called a "link"), which is then paused for temporary communication over the other connection and thereafter resumed. The toggling between or among connections has to take place at a relatively high rate (e.g., less than 20 ms) to avoid the toggling to be visible in video content. For this reason, the conventional approach is to avoid the toggling by providing a separate transceiver for each connection. Unfortunately, each additional transceiver requires additional space and power and increases the cost of the device.

It is realized herein that providing a separate transceiver for each connection is unnecessary. It is realized herein that Wi-Fi employs a MIMO transceiver capable of operating in multiple bands. It is further realized that the transceiver may be rearchitected to accommodate a concurrent multiple-band connection mode in which the transceiver toggles between or among plural bands at a rate suitable for virtual concurrent operation. More specifically, it is realized herein that LOs may be provided and multiplexed to cause the transceiver selectively to operate in such a mode. For example, a 2×2 Wi-Fi transceiver may be operated in a unified, 2×2 MIMO mode in either the 2.4 GHz band or the 5 GHz band or as separate 1×1 transceivers, one operating in the 2.4 GHz band, and the other operating in the 5 GHz band.

Accordingly, introduced herein are various embodiments of a Wi-Fi transceiver operable to provide virtual concurrent wireless communication and a method of providing dual-band virtual concurrent wireless communication. In certain embodiments, an additional LO is provided and multiplexed to allow the transceiver to operate in the dual-band virtual concurrent mode. In related embodiments, the Wi-Fi transceiver and method support concurrent connections in the existing 2.4 and 5 GHz bands.

Figure 1:
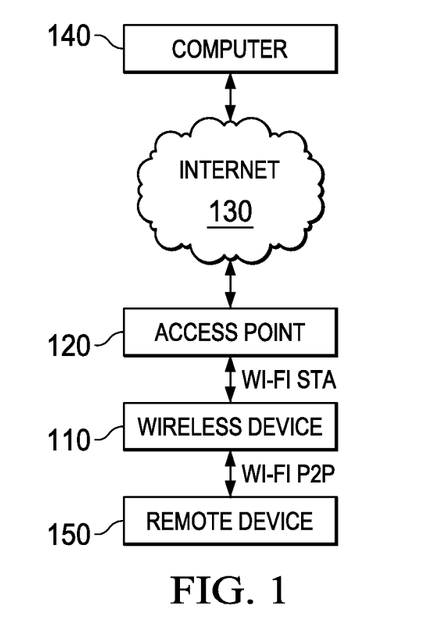
FIG. 1 is a diagram of one embodiment of a wireless networking infrastructure in which a device wirelessly communicates with multiple devices or networks.

Before describing various embodiments of the transceiver and method introduced herein, a wireless networking infrastructure in which such a transceiver or method may operate will be described. Accordingly, FIG. 1 is a diagram of one embodiment of a wireless networking infrastructure in which a device wirelessly communicates with multiple devices or networks.

A wireless device 110 is capable of communicating over multiple concurrent wireless connections. In the embodiment of FIG. 1, the wireless device 110 engages in a first connection with a WAP 120 of the Internet 130 with which many computers (e.g., servers) are connected. FIG. 1 shows one such computer 140. In the first connection, the wireless device 110 operates as a station. The wireless device 110 concurrently engages in a second connection with a remote device 150. In the second connection, the remote device 150 is tethered to the wireless device 110 via a P2P connection.

In one example, the wireless device 110 is interacting with a web site (not shown) of the Internet 130 and concurrently displaying video output relating to its interaction with the web site on a television set provided (or "enabled") with wireless networking capability, which constitutes the remote device 150 in this example. The first connection may be over the 2.4 GHz band, and the second connection may be over the 5 GHz band, or vice versa. Alternatively, both the first and second connections may be over the 2.4 GHz band or the 5 GHz band.

In the illustrated embodiment, the wireless device 110 is a smartphone. As those skilled in the pertinent art understand, a smartphone is generally characterized as having a prominent display screen and providing an application programming interface (API) to an operating system (OS) allowing third-party software applications, typically called "apps," to execute in the smartphone. Examples of current smartphones use the Android, iOS®, Windows® Phone, BlackBerry® or Bath®, Symbian®, Palm OS®, Windows® Mobile™ OS. In an alternative embodiment, the wireless device 110 is a tablet, such as an Apple® iPad®, an Asus® Transformer¹, an EVGA™ Tegra®, a Lenovo® Yoga®, an LG® G Pad™, a Panasonic® Toughpad®, a Samsung® Galaxy Note™ or a Microsoft® Surface™ In another alternative embodiment, the wireless device 110 is an e-reader, such as an Amazon® Kindle® or a Barnes & Noble® Nook®. In yet another embodiment, the wireless device 110 is a laptop computer, of which there are many available types. In still another embodiment, the wireless device 110 is a desktop computer or server.

In an alternative embodiment, the remote device 150 is a computer monitor provided with wireless networking capability. In another alternative embodiment, the remote device 150 is a video projector "enabled" with wireless networking capability. In yet another alternative embodiment, the remote device 150 is any device that can wirelessly communicate with the wireless device 110.

As stated above, the conventional approach to accommodate higher toggling rates between or among multiple connections is to provide a separate transceiver for each connection. To maintain data rates, each additional transceiver requires an additional IF strip, an analog phase-locked loop (PLL) to serve as an LO, an analog-to-digital converter (ADC), a digital-to-analog converter (DAC) and a MAC. It is realized herein that a MIMO transceiver may be augmented with an additional PLL and MAC to give it the capability to provide dual-band virtual concurrent wireless communication without requiring data rates to be reduced.

Figure 2:
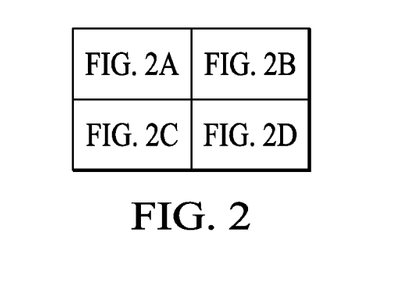
FIG. 2 is divided into FIGS. 2A-D and is a diagram of one embodiment of the device of FIG. 1 showing, in particular, one embodiment of radio-frequency (RF) front-end circuitry of a transceiver thereof.
Figure 2A:
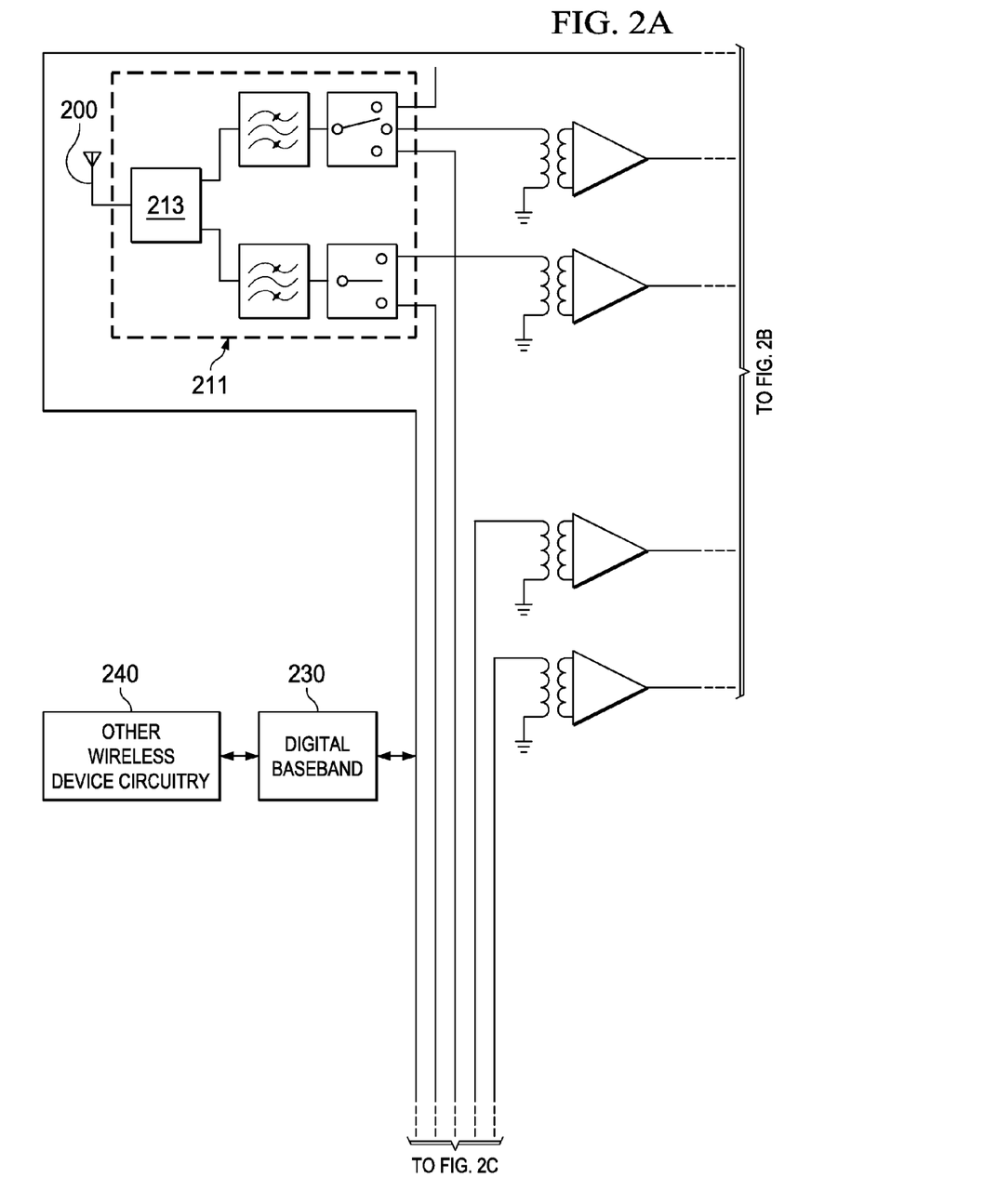
Figure 2B:
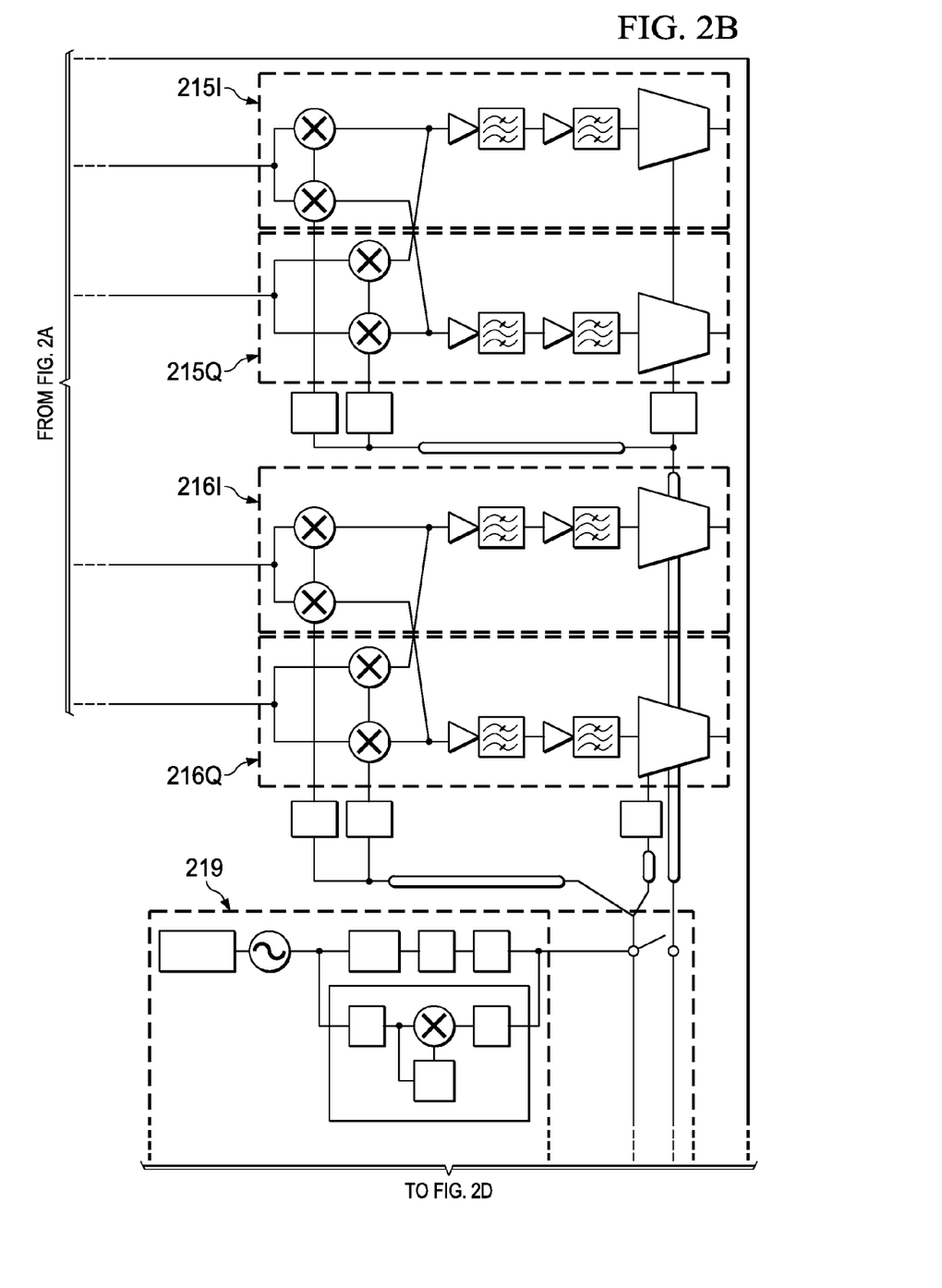
Figure 2C:
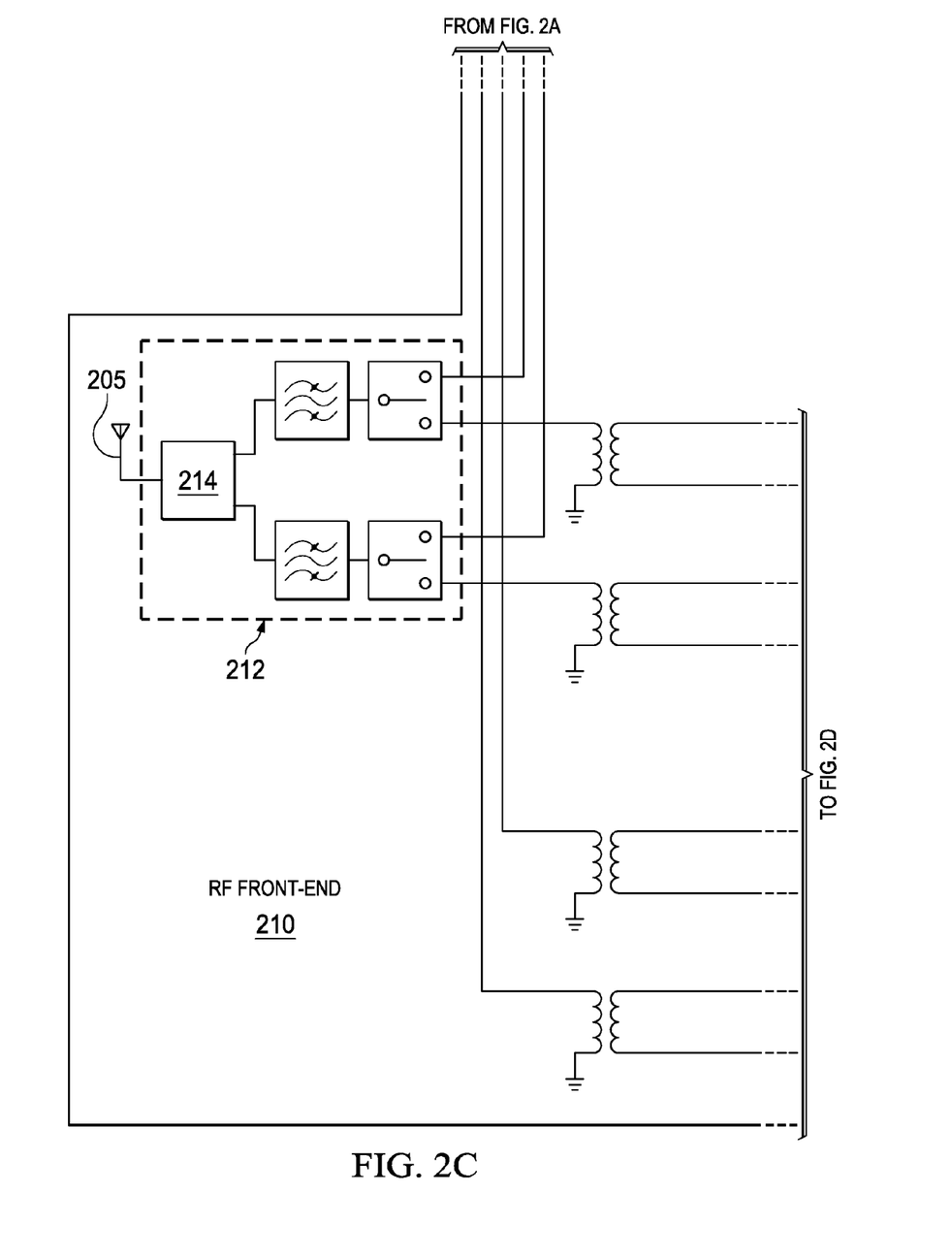
Figure 2D:
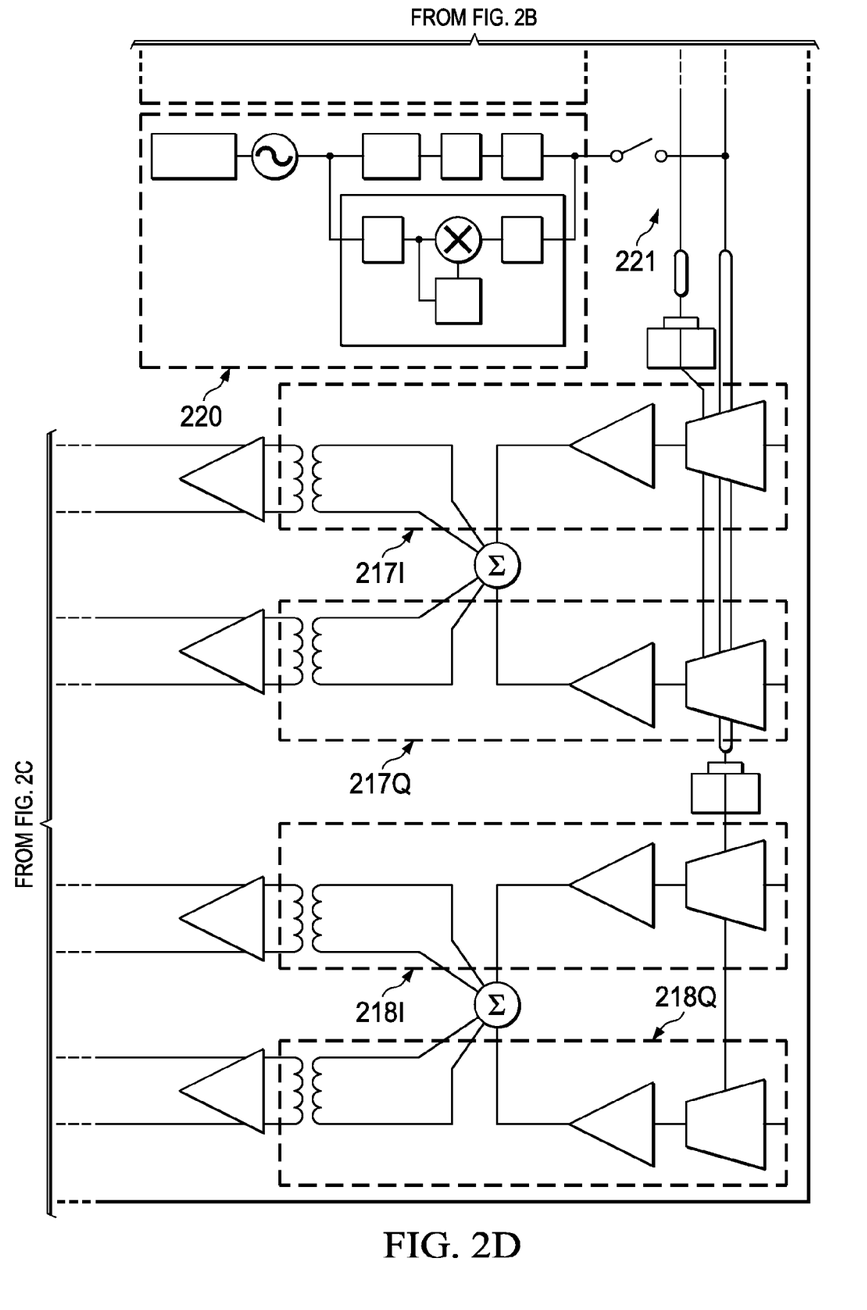

FIG. 2 is divided into FIGS. 2A-D and is a diagram of one embodiment of a wireless device, e.g., the wireless device 110 of FIG. 1. The wireless device includes one embodiment of RF front-end circuitry 210, one embodiment of digital baseband circuitry 230 and other wireless device circuitry 240, which may include a processor, memory, a display and one or more buttons. The RF front-end circuitry 210 and the digital baseband circuitry 230 constitute a transceiver of the wireless device.

The RF front-end circuitry 210 includes antennas 200, 205. The antenna 200 is coupled to circuitry 211 that includes a duplexer 213 and unreferenced bandpass filters and switches that switch the antenna 200 for transmission and reception. The antenna 205 is coupled to circuitry 212 that includes a duplexer 214 and unreferenced bandpass filters and switches that switch the antenna 205 for transmission and reception.

During reception, two IF strips 215I, 215Q are provided for demodulation and analog-to-digital conversion of in-phase and quadrature components of signals received by the antenna 200 and therefore form a first receive pair of IF strips. Two IF strips 216I, 216Q are provided for demodulation and analog-to-digital conversion of in-phase and quadrature components of signals received by the antenna 205 and therefore form a second receive pair of IF strips. Data reflecting these in-phase and quadrature components are provided to the digital baseband circuitry 230 for further processing.

During transmission, two IF strips 217I, 217Q are provided for digital-to-analog conversion of data provided by the digital baseband circuitry 230 and modulation into in-phase and quadrature components for transmission by the antenna 200 and therefore form a first transmit pair of IF strips. Two IF strips 218I, 218Q are provided for digital-to-analog conversion of data provided by the digital baseband circuitry 230 and modulation into in-phase and quadrature components for transmission by the antenna 205 and therefore form a second transmit pair of IF strips.

First and second LOs 219, 220 provide clock signals that selectively drive the IF strips 215I, 215Q, 216I, 216Q, 217I, 217Q, 218I, 218Q. In the embodiment of FIG. 2, the first LO 219 is operable to provide a clock signal that causes the IF strips 215I, 215Q, 216I, 216Q, 217I, 217Q, 218I, 218Q to operate in the 5 GHz band, and the second LO 220 is operable to provide a clock signal that causes the IF strips 215I, 215Q, 216I, 216Q, 217I, 217Q, 218I, 218Q to operate in the 2.4 GHz band. Switches 221 are operable to multiplex the clock signals from the first and second LOs 219, 220 to the IF strips 215I, 215Q, 216I, 216Q, 217I, 217Q, 218I, 218Q as appropriate to the mode in which the transceiver is operating. In a unified, MIMO mode, the switches 221 are operable to couple only the first LO 219 to the IF strips 215I, 215Q, 216I, 216Q, 217I, 217Q, 218I, 218Q. The first LO 219 can then drive the IF strips 215I, 215Q, 216I, 216Q, 217I, 217Q, 218I, 218Q to operate in one of multiple bands (e.g., 2.4 GHz or 5 GHz). In a concurrent multiple-band connection mode, the switches 221 are operable to couple the first LO 219 to a transmit pair and a receive pair of the IF strips 215I, 215Q, 216I, 216Q, 217I, 217Q, 218I, 218Q (e.g., the second receive pair of IF strips 216I, 216Q and the first transmit pair of IF strips 217I, 217Q). In the concurrent multiple-band connection mode, the switches 221 are further operable to couple the second LO 220 to another transmit pair and a receive pair of the IF strips 215I, 215Q, 216I, 216Q, 217I, 217Q, 218I, 218Q (e.g., the first receive pair of IF strips 215I, 215Q and the second transmit pair of IF strips 218I, 218Q).

Figure 3:
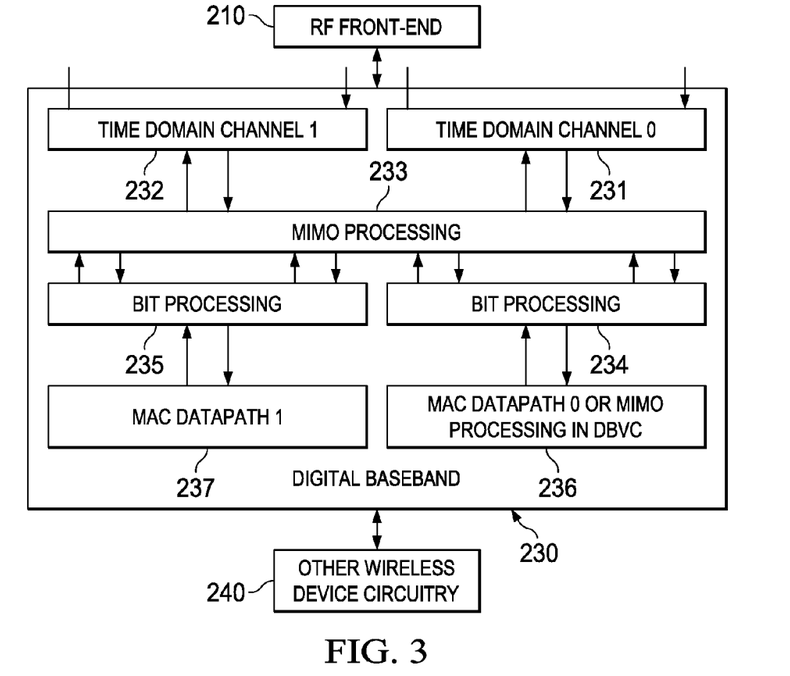
FIG. 3 is a diagram of one embodiment of the device of FIG. 1 showing, in particular, one embodiment of digital baseband circuitry of a transceiver thereof.

FIG. 3 is a diagram of one embodiment of the device of FIG. 1 showing, in particular, one embodiment of the digital baseband circuitry 230 of a transceiver thereof. The digital baseband circuitry 230 includes time domain channel circuitry 231, 232 for MIMO channels 0 and 1, respectively. MIMO processing circuitry 233 is coupled to the time domain channel circuitry 231, 232. Bit processing circuitry 234, 235 for datapaths 0 and 1, respectively, are coupled to the MIMO processing circuitry 233. MACs 236, 237 for the datapaths 0, 1 are respectively coupled to the bit processing circuitry 234, 235.

In the unified, MIMO mode, other wireless device circuitry 240 provides data to the MACs 236, 237 along datapaths 0 and 1. The data is processed in the respective bit processing circuitry 234, 235 and then passed to the MIMO processing circuitry 233, where the data is transformed into the MIMO time domain channels 0 and 1 in the time domain channel circuitry 231, 232. The data in the time domain channels 0 and 1 is then passed to the first and second transmit pairs of IF strips 217I, 217Q, 218I, 218Q for conversion to analog form and RF modulation in one band (e.g., 2.4 GHz or 5 GHz) and eventual transmission via the antennas 200, 205. Signals received by the antennas 200, 205 are RF demodulated and converted to digital form in the first and second receive pairs of IF strips 215I, 215Q, 216I, 216Q and passed to the time domain channel circuitry 231, 232, where it is transformed out of the time domain channels 0 and 1 and passed to the MIMO processing circuitry 233. The MIMO processing circuitry 233 then places the data in the datapaths 0 and 1, at which time the respective bit processing circuitry 234, 235 and MACs 236, 237 further process and make the data available to the other wireless device circuitry 240.

In the concurrent multiple-band connection mode, other wireless device circuitry 240 provides data to the MACs 236, 237 along datapaths 0 and 1. The MAC 236 functions as MIMO processing circuitry in the concurrent multiple-band connection mode. The data is processed in the respective bit processing circuitry 234, 235 and then passed to the MIMO processing circuitry 233, where the data remains divided into the datapaths 0 and 1. The data in the datapath 0 is then passed to the first transmit pair of IF strips 217I, 217Q for conversion to analog form and RF modulation in one band (e.g., 2.4 GHz) and eventual transmission via the antenna 205. The data in the datapath 1 is then passed to the second transmit pair of IF strips 218I, 218Q for conversion to analog form and RF modulation in another band (e.g., 5 GHz) and eventual transmission via the antenna 200. Signals received by the antenna 200, 205 are RF demodulated from one band (e.g., 5 GHz) and converted to digital form in the first receive pair of IF strips 215I, 215Q. Signals received by the antenna 205 are RF demodulated from another band (e.g., 2.4 GHz) and converted to digital form in the second receive pair of IF strips 216I, 216Q. The digital data from the first and second receive pair of IF strips 215I, 215Q, 216I, 216Q are then passed to the time domain channel circuitry 231, where it is transformed out of the time domain channels 0 and 1 and passed to the MIMO processing circuitry 233. The MIMO processing circuitry 233 then places the data in the datapaths 0 and 1, at which time the respective bit processing circuitry 234, 235 and MACs 236, 237 further process and make the data available to the other wireless device circuitry 240.

Figure 4:
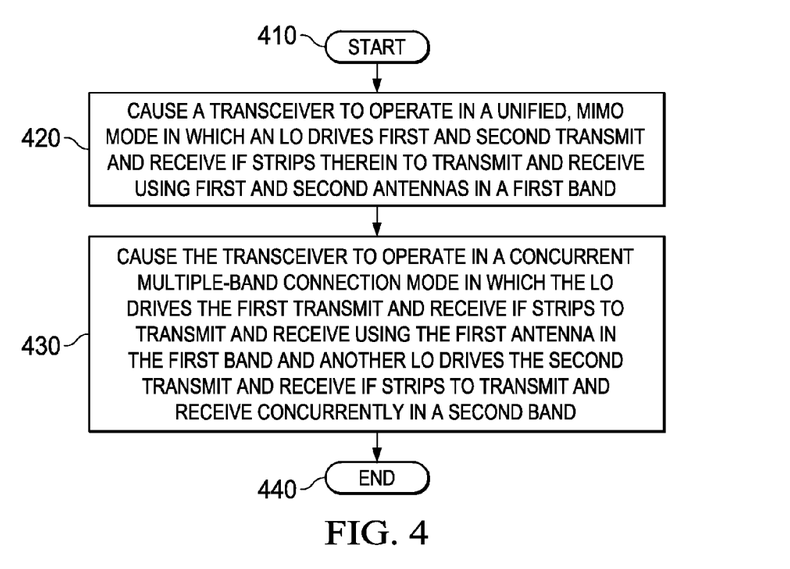
FIG. 4 is a flow diagram of one embodiment of a method of providing dual-band virtual concurrent wireless communication.

FIG. 4 is a flow diagram of one embodiment of a method of providing dual-band virtual concurrent wireless communication. The method begins in a start step 410. In a step 420, a transceiver is caused to operate in a unified, MIMO mode in which an LO drives first and second transmit and receive IF strips therein to transmit and receive using first and second antennas in a first band. In a step 430, the transceiver is caused to operate in a concurrent multiple-band connection mode in which the LO drives the first transmit and receive IF strips to transmit and receive using the first antenna in the first band and another LO drives the second transmit and receive IF strips to transmit and receive concurrently in a second band. The method ends in an end step 440.

Those skilled in the art to which this application relates will appreciate that other and further additions, deletions, substitutions and modifications may be made to the described embodiments.

What is claimed is:
1. A transceiver, comprising:
   first transmit and receive intermediate frequency (IF) strips;
   second transmit and receive IF strips;
   first and second local oscillators (LOs);
   switches operable to multiplex clock signals from the first and second local oscillators to cause said transceiver to operate in a selectable one of:

a unified, multiple-input, multiple-output (MIMO) mode in which said first and second transmit and receive IF strips are driven to transmit and receive in a first band, and a concurrent multiple-band connection mode in which said first transmit and receive IF strips are driven in said first band and said second transmit and receive IF strips are concurrently driven in a second band; and digital baseband circuitry coupled to said first and second transmit and receive IF strips and including a media access controller (MAC) operable as a MIMO processor in said concurrent multiple-band connection mode.

2. The transceiver as recited in claim 1 further comprising digital baseband circuitry coupled to said first and second transmit and receive IF strips and operable to provide first and second time domain MIMO channels thereto in said unified, MIMO mode.

3. The transceiver as recited in claim 1 wherein said first LO is operable selectably to drive said first and second transmit and receive IF strips in said first and second bands.

4. The transceiver as recited in claim 1 wherein said second LO is operable selectably to drive said first and second transmit and receive IF strips in said first and second bands.

5. The transceiver as recited in claim 1 wherein said first and second transmit and receive IF strips are allocated to in-phase and quadrature signal components.

6. The transceiver as recited in claim 1 wherein said first and second bands are selected from the group consisting of:
 a 2.4 GHz band, and
 a 5 GHz band.

7. A method of providing multiple-band virtual concurrent wireless communication, comprising:

causing a transceiver to operate in a unified, multiple-input, multiple-output mode in which a local oscillator (LO) drives first and second transmit and receive intermediate frequency (IF) strips therein to transmit and receive using first and second antennas in a first band;

causing the transceiver to operate in a concurrent multiple-band connection mode in which said LO drives said first transmit and receive IF strips to transmit and receive using said first antenna in said first band and another LO drives said second transmit and receive IF strips to transmit and receive concurrently in a second band; and operating a media access controller (MAC) in digital baseband circuitry coupled to said first and second transmit and receive IF strips as a MIMO processor in said concurrent multiple-band connection mode.

8. The method as recited in claim 7 further comprising providing first and second time domain MIMO channels to said first and second transmit and receive IF strips in said unified, MIMO mode.

9. The method as recited in claim 7 further comprising driving said first and second transmit and receive IF strips in said first and second bands.

10. The method as recited in claim 7 further comprising selectably driving said first and second transmit and receive IF strips in said first and second bands.

11. The method as recited in claim 8 wherein said first and second transmit and receive IF strips are allocated to in-phase and quadrature signal components.

12. The method as recited in claim 7 wherein said first and second bands are selected from the group consisting of:
 a 2.4 GHz band, and
 a 5 GHz band.

13. A wireless device, comprising:
a radio-frequency (RF) front-end, including:
 first and second antennas,
 first transmit and receive intermediate frequency (IF) strips coupled to said first antenna,
 second transmit and receive IF strips coupled to said second antenna,
 a first local oscillator (LO) operable to cause modulation in one of a first band and a second band, and
 a second LO operable to cause modulation in said second band;

a digital baseband coupled to said RF front-end and operable in a unified, multiple-input, multiple output (MIMO) mode and a multiple-band connection mode and including:
 first and second time domain channel circuitry for first and second time-domain channels,
 MIMO processing circuitry coupled to said first and second time domain channel circuitry,
 first and second bit processing circuitry coupled to said MIMO processing circuitry, and
 first and second media-access controllers (MACS) coupled to said first and second bit processing circuitry, said first MAC operable as said MIMO processing circuitry in said multiple-band connection mode; and other wireless device circuitry coupled to said digital baseband.

14. The wireless device as recited in claim 13 wherein said digital baseband circuitry is operable to provide first and second time domain MIMO channels thereto in said unified, MIMO mode.

15. The wireless device as recited in claim 13 wherein said first LO is operable selectably to drive said first and second transmit and receive IF strips in said first and second bands.

16. The wireless device as recited in claim 13 wherein said second LO is operable selectably to drive said first and second transmit and receive IF strips in said first and second bands.

17. The wireless device as recited in claim 13 wherein said first and second transmit and receive IF strips are allocated to in-phase and quadrature signal components and said first and second bands are selected from the group consisting of:
 a 2.4 GHz band, and
 a 5 GHz band.

* * * * *